Aug. 11, 1964 S. E. WARRING 3,144,608

DATA TRANSMISSION UTILIZING PHASE-SHIFT MODULATION

Filed Feb. 21, 1961 2 Sheets-Sheet 1

INVENTOR
STIG ERIK WARRING
BY Hane and Nydick
ATTORNEYS

INVENTOR
STIG ERIK WARRING
BY Hane and Nydick
ATTORNEYS

United States Patent Office 3,144,608

Patented Aug. 11, 1964

3,144,608
DATA TRANSMISSION UTILIZING PHASE-SHIFT MODULATION

Stig E. Warring, Hagersten, Sweden, assignor to Telefonaktiebolaget L M Ericsson, Stockholm, Sweden, a corporation of Sweden Filed Feb. 21, 1961, Ser. No. 90,780
Claims priority, application Sweden Feb. 23, 1960
3 Claims. (Cl. 325—30)

Figure 1:
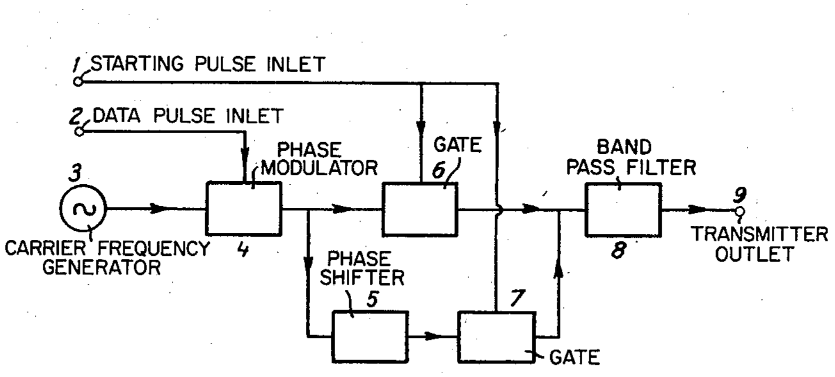

The present invention refers to a data transmission arrangement, where the transmitted information is expressed in pulse form according to the binary system, and where these binary data pulses are transmitted by means of phase positions of a carrier wave, which phase positions are displaced 180° relatively one another.

Information is now often transmitted in digital form, as the case is for example with information transmission between data processing centres, where the information in question has binary form. Even when the information is in analogy form it can often be to advantage to transform it to digital form for the transmission. As an example, remote metering and telephony transmission by pulse code modulation may be mentioned.

Pure direct current pulses are not suitable when the information is to be transmitted over great distances, or when frequencies near zero cannot be transmitted. For the transmission the direct current pulses are therefore generally transformed to amplitude, frequency or phase modulated pulses.

With data transmission the transmitted information is divided into signals and at the beginning of each signal some form of starting signal is sent, so that the receiver is able to distinguish between the different communications and to know when the particular signal starts. With time-divided multi channel telephony transmissions starting signals are also required to assist with distinguishing the different telephony channels.

When the binary number system is used in phase modulated data transmission systems it is necessary on the receiver side to determine which phase position corresponds to a binary one respectively to a binary zero. According to a previously known system a zero, for example, is always directly sent after the starting signal. The receiver side knows then that the phase position of the carrier wave for the pulse arriving directly after the starting signal corresponds to a zero and that the reversed phase position corresponds to a one. This pulse is then delayed one bit and its phase position is compared in a phase detector with the phase position of the just arriving data pulse. This data pulse is also a zero when the two phase positions correspond, but is a zero when the two phase positons are displaced 180° relatively one another. The data pulse is then delayed and its phase position is compared with the phase position of the subsequent data pulse and so on.

This method of comparing the phase positions of subsequent data pulses has two disadvantages. The method requires a fixed relation between carrier frequency and pulse frequency, which thus cannot be adjusted independently of one another, which is often desired for utilizing existing transmission media in the most effective way, and the method does not give the best possible relation between signal and interference, since the delayed signal is directly used as phase-comparing potential and contains thus interference from the transmission medium.

If the phase position of, for instance, a pulse on the receiver side sent directly after the starting signal is used to determine the phase of a phase reference potential generated on the receiver side corresponding to a zero respectively a one, the above disadvantages can be eliminated. If the starting signal is transmitted by quadrature modulation, it can also be utilized for transmission of phase reference and has then the advantage that the total time interval, which is required for transmission of a starting signal a phase reference, is less than in previously known cases.

In accordance with this the present invention resides in an arrangement for transmission of signals which are composed of data pulses transmitted by means of phase positions of a carrier wave which phase positions are displaced 180° relatively one another, in which arrangement the sender side comprises means for generating a reference phase signal during a time interval which is short in relation to the length of a transmitted signal, and the receiver side comprises devices which are operable by a fed signal in such a way that a phase reference potential derived from said signal, which phase reference potential is arranged to be fed to a phase comparing arrangement with at least two inlets, appears at the outlet of said device. A phase detector compares the phase positions of said phase reference potential and the phase reference signal coming from the sender, the output-potential from the outlet of said phase detector being arranged over a bi-stable element to operate a phase shifter, which is connected in series with one inlet of said phase comparing arrangements in such a way that the potential fed to said inlet has its phase unchanged or shifted depending on the polarity of the output-signal from said phase detector, whereby an unequivocal determination of data pulses derived from the received signals can be obtained.

Figure 2:
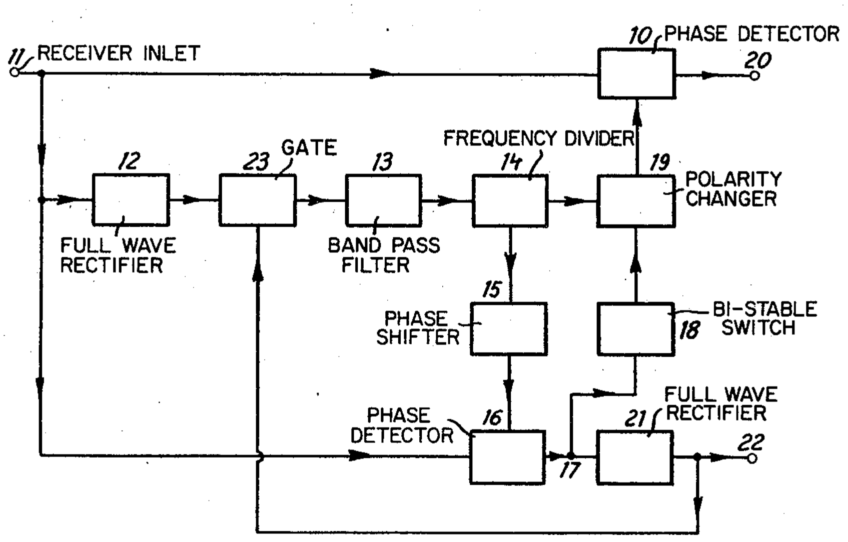
Figure 3:
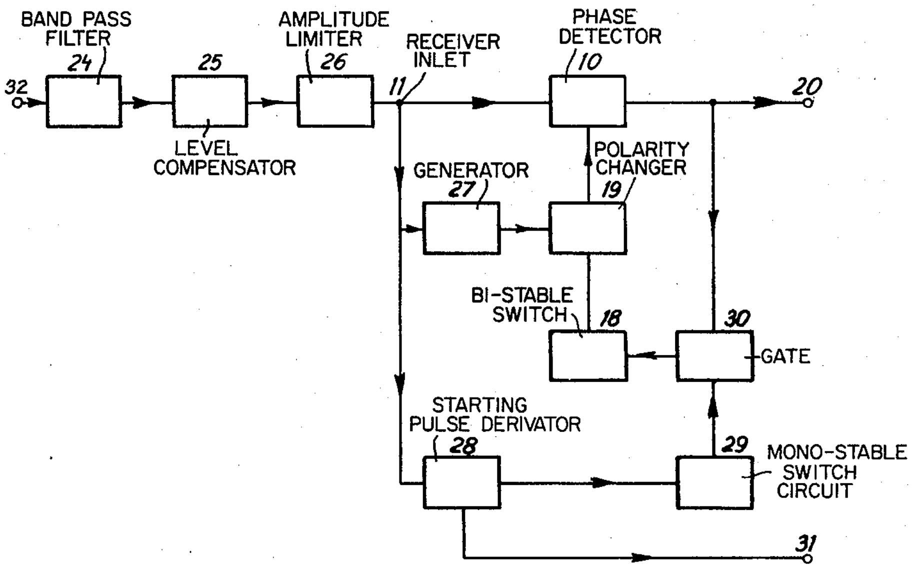

The invention will be further described in connection to the accompanying drawings, where FIG. 1 shows a phase modulated data sender and FIGS. 2 and 3 show alternative forms of embodiments of a data receiver according to the invention.

In FIG. 1, which shows the sender part of a data transmission arrangement and more particularly its carrier frequency part, a sender inlet 1 is fed with a starting pulse, which for example is three bits long, and a second sender inlet 2 is fed with data pulses, in which pulses for example a one is corresponded by a positive pulse and a zero by a negative pulse. A signal will now consist of a starting pulse followed by the data pulses in question. There is also provided a carrier frequency generator 1 and a phase modulator 4, which latter in its simplest form may consist of a common ring modulator, which is controlled by the data pulses in such a way that a negative data pulse transmits the carrier frequency of the generator 3 directly while a positive data pulse transmits the carrier frequency with a phase shift of 180°. A phase shifting network 5 effects a 90° phase shift for the carrier frequency in question. During the starting pulse interval there are no data pulses, and the inlet 2 is then assumed to have negative potential, so that the modulator 4 transmits the carrier frequency without phase shift. The starting pulse closes a gate 6, which is normally open, and opens a second gate 7, which is normally closed. These gates may be of a suitable previously known electronic type. During the starting pulse interval the carrier frequency will thus be transmitted with a phase shift of 90°. Starting and data pulses are sent through a pulse-forming network 8, for instance a band pass filter, to a suitable transmission medium which is connected to the sender outlet 9.

FIG. 2 shows a form of embodiment of a data receiver according to the present invention, where 11 indicates the inlet of a phase detector 10, which is fed with phase modulated signals over the transmission medium, suitably after frequency band limitation, level compensation and amplitude limitation. The arriving signal is furthermore fed to a full-wave rectifier 12 and then to a band pass filter 13, in which a frequency corresponding to the double carrier frequency of the phase modulated signal is separated. The filter 13 can also be replaced by a free-running oscillator, the phase of which is controlled by the output-potential from a full-wave rectifier 12. At the outlet of a subsequent frequency divider 14 a potential with the same frequency as the carrier frequency of the phase modulated signal is then obtained. Rectifier 12, filter 13 and potential divider 14 constitute a carrier-wave-regenerating means. The output potential from the divider is then used as phase reference potential, but its phase position can be the correct one or be displaced 180°, depending on how the synchronization of the double frequency from the filter 13 has started. To obtain the correct polarity of the phase reference potential fed to the phase detector 10 it is also fed to a 90° phase shifting network 15 and then to a second phase detector 16, which is also fed directly with the arriving signal. The phase reference potential is fed directly with the input signal. The phase reference potential fed to the phase detector 16 is phase displaced +90° relatively the phase position of a zero and phase displaced −90° relatively the phase position of a one. The phase detector 16 thus produces the output-potential zero when data pulses are fed independently whether they represent zeros or ones. Since the starting signal is transmitted by quadrature modulation, it produces at the outlet 17 of the phase detector 16 a potential, which either is positive or negative, depending upon whether the phase reference potential has the correct phase position or is displaced 180°. The output-potential from the phase detector 16 is fed to a bi-stable switch circuit 18 and sets the latter into a position corresponding to a one when the output-potential is positive. The switch circuit 18 actuates in turn a pole changer 19 connected between the frequency divider 14 and the phase detector 10. The pole changer is of the electronic type and consists for example of a simple ring modulator. If the switch circuit 18 takes a position corresponding to a one, a control voltage is fed to the pole changer such that the output-potential from the frequency divider is directly fed to the phase detector 19 as phase reference potential. If the output potential from the frequency divider should have the wrong polarity (be displaced 180°) the phase reference potential fed to the phase detector 16 will be displaced 180°. During the interval when the starting signal is received the phase detector 16 gives a negative output-potential at point 17 so that the switch circuit 18 is set in zero position. The switch circuit will then feed a control potential which has reversed polarity to the previous one, to the pole changer 19. The latter then changes the phase position of the potential coming from the pulse divider by 180° so that it is fed as phase reference potential with the correct polarity to the phase detector 10. Thus the correct polarity of the phase reference potential will be checked at the beginning of each signal, that is when a starting signal arrives. The same function can be obtained by connecting the outlet of the frequency divider 14 directly to the phase detector 10 and the pole changer 19 in series between the inlet 11 and connecting the detector 10.

At the outlet 20 of the phase detector 10 the reformed data pulses are obtained as positive respectively negative direct current pulses while a starting signal produces the output-potential zero. At the outlet 17 of the phase detector 16 a starting pulse is obtained which also is of direct current type and may either have positive or negative polarity, depending upon how the frequency divider has started to be synchronized by the double carrier frequency from the filter 13. A full-wave rectifier 21 is therefore connected to point 17, and from its outlet 22 a starting pulse is then obtained, which always obtains the same polarity, for example positive. This starting pulse is then fed to a gate 23, which normally is open, and blocks it during the time the starting signal lasts to prevent an undesired phase shift of said double carrier frequency. This can be obtained by making the transient time of the filter 13 so high that there is no time for the phase reference potential to be turned appreciably before the gate 23 is closed. The circuits in the filter have such a high Q-value that the oscillations with the double carrier frequency are not attenuated during the rest of the starting signal when the inlet of the filter is blocked. As soon as the starting pulse ceases, the gate 23 is opened again.

FIG. 3 shows another form of embodiment according to the invention. The receiver is fed through its inlet 32 with the arriving signals, which then are led into the phase detector 10 through a band pass filter 24, a level compensator 25 and an amplitude limiter 26. A generator 27, which is known per se, for example through full-wave rectifying and frequency doubling with attendant frequency halving, generates a phase reference potential, is connected through the pole changer 19 to the phase detector 10. The outlet of the amplitude limiter 26 is connected to a network 28 for derivation of a starting pulse. If the starting signal is transmitted, for example, by means of a special frequency, network 28 may comprise a band pass filter for this frequency and an amplitude detector. When for example the phase reference information is transmitted in such a way that the first pulse after the starting pulse shall always correspond to a one, said starting pulse is fed to a monostable switch circuit 29, which reacts to the trailing edge of the starting pulse. This switch circuit is then conducting and retains this condition as long as the first pulse after the starting pulse lasts, and during this time interval the output-potential of the phase detector 10 is fed through a gate 30 opened by the switch circuit 29 to bi-stable switch circuit 18. If the output-potential of the phase detector 10 has a polarity, for instance positive, that corresponds to a detected one, the switch circuit 18 is set into the position which corresponds to a one, and the phase reference signal of the generator 27 is then fed without phase shift through the pole changer 19 to the phase detector 10. However, when the output-potential from the phase detector 10 has the wrong polarity, for instance, negative, during the time the phase reference signal lasts (the first pulse after the starting pulse), the switch circuit 18 is set to its zero position, and a control voltage of reversed polarity relatively the previously described case is fed to the pole changer 19, so that the latter displaces the phase position 180° of the phase reference potential which is fed to the phase detector 10. The switch circuit 18 retains its position during the remainder of the communication, that is, when the gate 30 is blocked. The switch circuit should be dimensioned with such operation and release times that a possible feed back in the circuit 30, 18, 19 is prevented. With this form of embodiment the data pulses will thus be obtained at the outlet 20 and a starting pulse at the outlet 31.

The invention is, of course, not restricted to the embodiments shown in the accompanying drawings, but can be varied as to details within the scope of invention.

I claim:

1. A communication system comprising first transmission means for transmitting signals composed of reference pulses and binary data pulses modulated on a carrier wave, said transmission means including modulating means, means for supplying said reference pulses and said binary data pulses to said modulating means together with said carrier wave, said modulating means modulating said carrier wave by shifting the phase positions of said carrier wave 180° relatively to one another and modulating the carrier wave by said reference pulses by at least one phase shifting of 90° of said phase position; receiving means for receiving said transmitted modulated signals, said receiving means having one input and two outputs, one for data pulses and one for reference pulses, a phase detector for detecting said data pulses, said phase detector having a first and a second input and an output, the first input of the detector being connected to the input of the receiving means and the output of the detector being connected to the output for data pulses, means for detecting said reference pulses, said reference pulse detecting means being connected between the input of the receiving means and said output for reference pulses, means for regenerating said carrier wave from the input signal, a phase shifter having a first and a second input for shifting the phase of said regenerated carrier wave 180°, said regenerating means having its input connected to the input of the receiving means and its output connected to said first input of said phase shifter, the output of which is connected to said second input of said phase detector, a bi-stable circuit connected to said second input of said phase shifter so as to cause 180° phase shifting in the carrier wave upon its activation, and means producing positive and negative pulses respectively responsive to said reference pulses and activating said bi-stable circuit by means of one of said positive or negative pulses; and second transmission means for transmitting said modulated pulses from said modulating means to said receiving means, said second transmission means connecting said modulating means and said input of said receiving means.

2. A communication system according to claim 1 wherein said means for producing positive and negative pulses respectively comprises said phase detector.

3. A communication system according to claim 1 wherein said means for producing positive and negative pulses respectively comprises said means for detecting reference pulses.

References Cited in the file of this patent

UNITED STATES PATENTS 2,979,566 Hopner et al. ---------- Apr. 11, 1961